July 10, 1956     R. R. DOUGLAS     2,753,712

TEMPERATURE COMPENSATED TANGENT

Filed Aug. 4, 1954

INVENTOR.
Robert R. Douglas
BY
Ralph Hammar
Attorney

United States Patent Office 2,753,712
Patented July 10, 1956

2,753,712

TEMPERATURE COMPENSATED TANGENT

Robert Ritson Douglas, Erie, Pa., assignor to American Meter Company, Incorporated, Erie, Pa., a corporation of Delaware Application August 4, 1954, Serial No. 447,883

4 Claims. (Cl. 73—281)

In gas meters, the change in gas volume with temperature causes under registration at low gas temperatures and over registration at high gas temperatures. Temperature also has an effect on the meter diaphragms and valve friction which affects the registration. This invention is intended to compensate for the temperature effects by adjustment of the tangent through a thermostatically controlled cam which can have a surface generated to provide perfect compensation for all of the factors affecting registration in any meter including not only the change in volume of the gas but also the effect of temperature on the meter diaphragms and valves and other operating parts of the meter. By reason of the compensation, the meter registration is corrected to correspond to gas at standard temperature.

Figure 1:
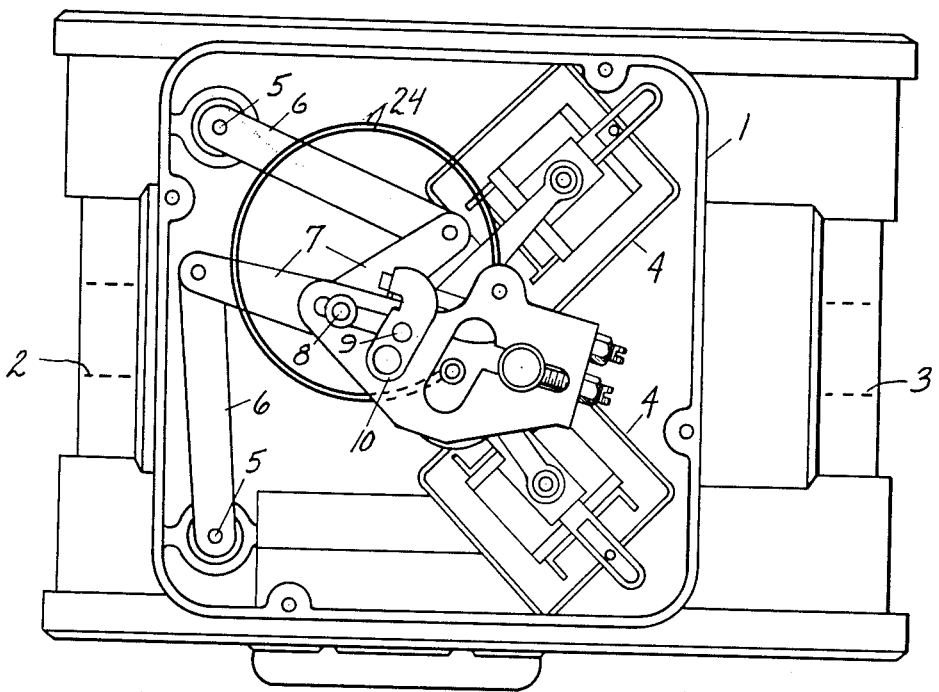
Figure 3:
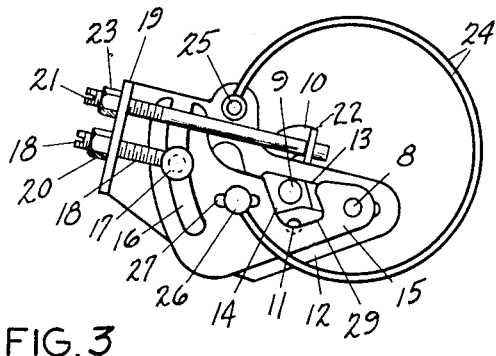
Figure 2:
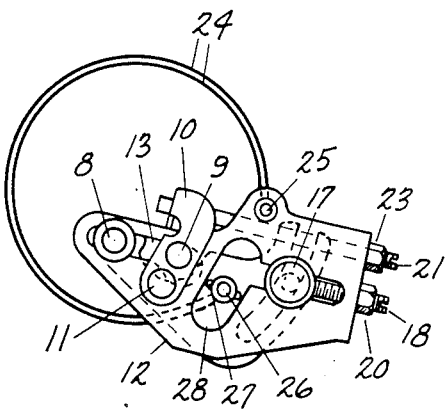
Figure 4:
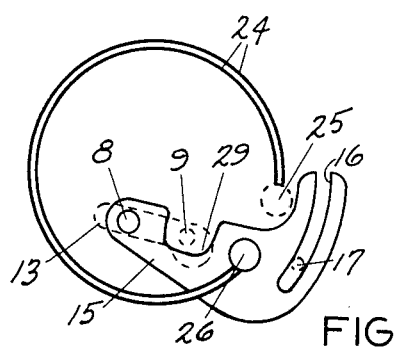

In the accompanying drawings, Fig. 1 is a top plan view of a gas distributing chamber, Fig. 2 is a top view of the thermostatically adjusted tangent, Fig. 3 is a bottom view of the tangent, and Fig. 4 is a diagrammatic view illustrating the operation of the thermostatic adjustment.

In Fig. 1 of the drawings the conventional parts of the gas meter are readily identified, 1 being the gas distributing chamber having inlet and outlet fittings 2 and 3, 4 being the valve chambers, 5 being the flag rods having fixed thereto crank arms 6 connected by links 7 to a wrist pin 8 on a tangent fixed to a crankshaft 9. Except for the tangent, the parts so far described are or may be of common construction. In the gas meter art, the parts for fixing the length of the stroke of the flag rods and the timing of the valves are known as the tangent.

In order to obtain correct registration of the volume of gas, the tangent usually has adjustments for the distance between the wrist pin 8 and the crankshaft 9 which controls the stroke of the gas measuring diaphragms and also an adjustment for the angular relation of the wrist pin 8 to the crankshaft 9 which controls the valve timing. When both the stroke of the wrist pin and the angular relation of the wrist pin are correctly adjusted, the meter will then accurately measure the volume of gas. However, because the density of the gas varies with temperature, the meter registration will not be an accurate measure of the quantity of gas unless the tangent has a temperature correction compensating for the change in density of the gas with temperature. Temperature also has an effect upon the registration of the meter due to changes in valve friction and diaphragm stiffness. These factors tend to make the meter register slow at cold temperatures. It is accordingly desirable that the temperature compensation for the tangent take care of not only the change in gas density but also the changes in meter registration attributable to temperature. All of these temperature factors are taken care of by the thermostatically adjusted tangent illustrated in detail in Figs. 2 and 3.

As shown in Fig. 2 the tangent has a bracket 10 soldered to the crankshaft 9 and carrying a pivot pin 11 pivoted in a plate 12. The plate 12 has a guide slot 13 for the wrist pin 8 there being an enlargement 14 to clear the crankshaft 9 as the plate 12 is pivoted about the pivot pin 11. The wrist pin 8 will accordingly be located by the guide slot 13 along a center line connecting the wrist pin and crankshaft. The wrist pin 8 projects through the slot 13 and as shown in Fig. 3 is fixed to one end of a cam plate 15 on the underside of the plate 12. At the other end of the cam plate 15 is a cam slot 16 receiving a pin 17 arranged substantially on the center line connecting the crankshaft 9 and the wrist pin 8. The pin 17 is supported on the inner end of an adjusting screw 18 threaded in a flange 19 on the supporting plate 12. By means of the adjusting screw 18 the cam plate 15 can be moved along the center line of the wrist pin 8 and the crankshaft 9 to adjust the distance between the wrist pin and the crankshaft and thereby set the stroke of the gas measuring diaphragms. After the adjustment is made, the adjusting screw 18 is locked in position by a lock nut 20. The valve timing or angular adjustment of the wrist pin 8 is effected by an adjusting screw 21 likewise threaded through the flange 19 on the supporting plate 12. The inner end of the adjusting screw is rotatably fixed in a flange 22 on the end of the bracket 10 opposite the pin 11. Accordingly as the adjusting screw is threaded in and out of the flange 19 the supporting plate 12 is rocked about the pivot pin 11 on the crankshaft 9 thereby changing the angular relationship of the wrist pin 8 to the crankshaft. When the adjusting screw 21 is set in the desired position it is held in the adjusted position by a lock nut 23.

The adjustments made by the adjusting screws 18 and 21 are made at standard or normal gas temperatures or an allowance made so that at this temperature the meter correctly registers the quantity of gas flowing through it. At gas temperatures lower than normal, because the gas shrinks in volume at lower temperatures the meter will register low or in other words the quantity of gas flowing through the meter will be greater than the quantity indicated by the meter register. The higher than normal gas temperatures have the opposite effect.

In order that the meter may correctly register the actual quantity of gas flowing through the meter independent of the temperature of the gas, the cam plate 15 is moved relative to the supporting plate 12 by means of a temperature responsive element such as the circular bi-metal 24. In the particular tangent illustrated there are two pieces of bi-metal 24, the two pieces being used to insure ample power. One end of the bi-metal is pivotally fixed at 25 to the supporting plate 12. The other end of the bi-metal is pivotally fixed at 26 to the cam plate 15. There is a slot 27 in the cam plate which permits adjustment of the position of the bi-metal with reference to the cam plate 15. The slot 27 is for calibration purposes and once the bi-metal is calibrated it thereafter has a fixed relation to the cam plate. The fastening 26 which anchors the bi-metal to the cam plate 15 conveniently is in the form of a lock nut. Under changes in gas temperature, the adjacent ends of the bi-metal respectively anchored at 25 to the supporting plate 12 and at 26 to the cam plate 15 move toward and away from each other thereby causing the cam plate to pivot about the wrist pin 8 and change the position of the pin 17 in the cam slot 16. In order that there may be no interference with the angular movement of the cam plate 15, the supporting plate 12 has a clearance slot 28 for the lock nut 26 and the cam plate has a clearance notch 29 for the crankshaft 9.

The operation of the thermostatic adjustment is diagrammatically illustrated in Fig. 4 where the cam plate 15 and the parts connected thereto are shown in full lines and only the essential parts of the supporting plate 12 are shown in dotted lines. From Fig. 4, it can be seen that as the end 26 of the bi-metal moves away from the end 25, the cam plate 15 is pivoted in a clockwise direction about the wrist pin 8. Since the cam slot 16 is formed at an angle to an arc centered on the connection between the wrist pin 8 and the cam plate 15, clockwise pivoting of the cam plate 15 relative to the supporting plate 12 causes the wrist pin to move to the left as viewed in Fig. 4 thereby increasing the distance between the wrist pin and the crankshaft 9 and accordingly increasing the stroke of the gas measuring diaphragms. This is in the direction to compensate for gas which is above normal temperature and which accordingly would show up on an uncompensated meter as over-registration. The increase in the stroke cuts down the registration so as to compensate for the higher gas temperature. As the end 26 of the bi-metal moves toward the end 25, the cam plate 15 is pivoted in a counter-clockwise direction about the wrist pin 8 and due to the shape of the cam slot 16 the wrist pin is moved closer to the crankshaft 9 thereby cutting down the stroke of the gas measuring diaphragms. This is in the direction to compensate for low temperature gas which would cause under-registration in a meter not having thermal compensations.

The shape of the cam slot 16 is generated so as to provide compensation for all temperature responsive factors affecting meter registration. Accordingly, the cam slot 16 will vary with different meter constructions but in all cases there will be temperature compensation so that correct registration of the quantity of gas will be obtained.

Because the pin 17 is substantially on a center line connecting the wrist pin 8 and crankshaft 9 and further because there is only a very slight angle between the pin 17 and the cam slot 16 the adjustment is essentially independent of the valve friction. Valve friction which increases the load on the wrist pin can have substantially no turning effect upon the cam plate 15 because the angle of contact between the pin 17 and the cam slot 16 is less than the angle of friction at which there could be slippage between the pin 17 and the cam slot. Accordingly, so far as load on the wrist pin is concerned, the pin 17 cooperates with the cam slot 16 in the same manner as though the pin were normal to or at right angles to the cam slot. On the other hand, the same small angle between the pin 17 and the cam slot 16 makes the cam slot serve as a low pitch wedge when the ends 25 and 26 of the thermostatic element 24 move toward and away from each other. This low pitch wedge is effective in moving the wrist pin along the slot 13 under very slight changes in temperature. The mechanical advantage obtained by locating the cam slot 16 at a relatively great distance from the wrist pin as compared to the distance between the wrist pin and crankshaft also contributes to the ease of operation. A relatively large movement at the cam slot 16 is translated into a relatively small movement of the wrist pin along the slot 13. There is very little hysteresis in the thermostatic adjustment. This is part due to the fact that the load on the wrist pin 8 is variable reversing during each rotation of the crankshaft so that any tendency of the pin 17 to stick in the cam slot 16 is substantially eliminated.

What is claimed as new is:

1. In a tangent, a wrist pin, a supporting plate adapted to be connected to a crankshaft and having a guideway therein for the wrist pin extending generally along a center line connecting the crankshaft and wrist pin, a cam plate pivotally movable about the wrist pin and having one end anchored to the wrist pin and the other end extending on the side of the crankshaft opposite the wrist pin, said cam plate having a cam slot in said other end of the cam plate extending at an acute angle to an arc centered on the wrist pin, a pin on the supporting plate received in said cam slot, and a thermostatic element connected between the cam plate and the supporting plate for pivoting the cam plate about the wrist pin in accordance with the gas temperature, said pin and cam slot cooperating to effect movement of said cam plate and wrist pin to vary the distance between said crankshaft and said wrist pin.

2. In a tangent, a wrist pin, a supporting plate adapted to be connected to a crankshaft and having a guideway therein for the wrist pin extending generally along a center line connecting the crankshaft and wrist pin, a cam member pivotally movable about and anchored to the wrist pin, a thermostatic means connected between the supporting plate and the cam member for pivoting the cam member about the wrist pin in accordance with gas temperature, and said supporting plate and cam member having a cam surface and a cam follower, one on the supporting plate and the other on the cam member, and cooperating to move the wrist pin and cam member along said guide slot in accordance with the gas temperature to vary the distance between the crankshaft and said wrist pin.

3. In a tangent, a wrist pin, a supporting plate adapted to be connected to a crankshaft and having a guideway therein for the wrist pin extending generally along a center line connecting the crankshaft and wrist pin, a cam member pivotally movable about and anchored to the wrist pin, an arcuate thermostatic element encircling the crankshaft and having one end connected to the cam member and the other end connected to the supporting plate for pivoting the cam member about the wrist pin in accordance with gas temperature, and said supporting plate and cam member having a cam surface and a cam follower, one on the supporting plate and the other on the cam member, and cooperating to move the wrist pin and cam member along said guide slot in accordance with the gas temperature to vary the distance between the crankshaft and said wrist pin.

4. In a tangent, a wrist pin, supporting means adapted to be fixed to a crankshaft for supporting the wrist pin for movement generally along a center line connecting the crankshaft and wrist pin, a member fixed to and pivotally movable about the wrist pin, said member extending from the wrist pin generally along said center line to the side of the crankshaft opposite the wrist pin, means on said opposite side of the crankshaft connected to said supporting means and to said pivoted member and cooperating to take the thrust between the crankshaft and wrist pin and to vary the distance between the crankshaft and wrist pin upon pivoting of said pivoted member relative to the supporting means, an arcuate thermostatic member responsive to gas temperature having ends connected respectively to said supporting means and to said pivoted member to effect pivotal movement of said pivoted member relative to said supporting means in accordance with temperature.

References Cited in the file of this patent

UNITED STATES PATENTS 2,015,267  Granberg _____ Sept. 24, 1935
2,339,956  Sillers _____ Jan. 25, 1944